United States Patent
Lee et al.

(10) Patent No.: US 7,609,859 B2
(45) Date of Patent: Oct. 27, 2009

(54) METHOD AND SYSTEM FOR GENERATING BI-LINEAR MODELS FOR FACES

(75) Inventors: Jinho Lee, Belmont, MA (US); Baback Moghaddam, Cambridge, MA (US); Hanspeter Pfister, Arlington, MA (US); Raghu Machiraju, Dublin, OH (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 910 days.

(21) Appl. No.: 11/152,528

(22) Filed: Jun. 14, 2005

(65) Prior Publication Data

US 2006/0280342 A1    Dec. 14, 2006

(51) Int. Cl.
*G06K 9/00* (2006.01)
*G06K 9/46* (2006.01)
*G06K 9/66* (2006.01)
*G06K 9/36* (2006.01)
*A61B 3/10* (2006.01)

(52) U.S. Cl. .................. 382/118; 382/115; 382/190; 382/285; 351/204

(58) Field of Classification Search ............ 382/118, 382/190
See application file for complete search history.

(56) References Cited

U.S. PATENT DOCUMENTS 6,160,907 A * 12/2000 Robotham et al. .......... 382/154

6,803,910 B2 * 10/2004 Pfister et al. ................ 345/420
2008/0247608 A1 * 10/2008 Vasilescu et al. ........... 382/118

OTHER PUBLICATIONS

Vasilescu et al., "Multilinear Analysis of Image Ensembles: TensorFaces", Proc. of the European Conference on Computer Vision, Copenhagen, Denmark, May 2002, pp. 447-460.*
R. Basri and D. Jacobs, "Lambertian Reflectance and Linear Subspace," IEEE Transaction on Pattern Analysis and Machine Intelligence, vol. 25, No. 2, pp. 218.233, 2003.
P. N. Belhumeur and D. J. Kriegman, "What is the set of images of an object under all possible lighting conditions?," in Proc. of Computer Vision and Pattern Recognition, 1996, pp. 270.277.
C. Beumier and M. Acheroy, "Automatic 3D Face Authentication," Image and Vision Computing, vol. 18, No. 4, pp. 315.321, 2000.
V. Blanz and T. Vetter, "Face Recognition based on fitting a 3D morphable model," IEEE Transactions on Pattern Analysis and Machine Intelligence, vol. 25, No. 9, pp. 1063.1074, 2003.

(Continued)

*Primary Examiner*—Brian P Werner
*Assistant Examiner*—Jose M Torres
(74) *Attorney, Agent, or Firm*—Dirk Brinkman; Gene Vinokur

(57) ABSTRACT

A method generates a three-dimensional, bi-linear, illumination model for arbitrary faces. A large number of images are acquired of many different faces. For each face, multiple images are acquired with varying poses and varying illumination. A three-mode singular value decomposition is applied to the images to determine parameters of the model. The model can be fit to a probe image of an unknown face. Then, the model can be compared with models of a gallery of images of unknown faces to recognize the face in the probe image.

8 Claims, 6 Drawing Sheets

OTHER PUBLICATIONS

Alexander M. Bronstein, Michael M. Bronstein, and Ron Kimmel, "Expression-Invariant 3D Face Recognition," in Proc. of the 4th Int. Conf. on Audio- and Video-Based Biometric Person Authentication, 2003, pp. 62.69.

Kyong I. Chang, Kevin Bowyer, and Patrick Flynn, "Face Recognition Using 2D and 3D Facial Data," in Multimodal User Authentication Workshop, 2003.

William T. Freeman and Josh B. Tennenbaum, "Learning Bi-linear Models for Two-Factor Problems in Vision," in Proceedings of Computer Vision and Pattern Recognition, 1997, pp. I:19.25.

A. S. Georghiades, P. N. Belhumeur, and D. J. Kriegman, "From Few to Many: Illumination Cone Models for Face Recognition Under Variable Lighting and Pose," IEEE Transactions on Pattern Analysis and Machine Intelligence, vol. 23, No. 6, pp. 643.660, 2001.

J. Huang, B. Heisele, and V. Blanz, "Component-based Face Recognition with 3D Morphable Models," in Proc. of the 4th Int. Conf. on Audio- and Video-Based Biometric Person Authenticitation Surrey, 2003.

L. D. Lathauwer, B. D. Moor, and J. Vandewalle, "A Multilinear Singular Value Decomposition," SIAM Journal of Matrix Analysis and Applications, vol. 21, No. 4, 2000.

K. Lee, J. Ho, and D. Kriegman, "Nine Points of Light: Acquiring Subspaces for Face Recognition under Variable Lighting," in Proceedings of Computer Vision and Pattern Recognition, 2001, vol. 1, pp. 519.526.

S. Romdhani, V. Blanz, and T. Vetter, "Face Identification by Fitting a 3D Morphable Model using Linear Shape and Texture Error Functions," in European Conference on Computer Vision, 2002, pp. 3.19.

T. Sim, S. Bazaker, and M. Bsat, "The CMU Pose, Illumination, and Expression (PIE) Database," in Proc. Int'l Conf. Automatic Face and Gesture Recognition, 2002, pp. 53.58.

M. A. O. Vasilescu and D. Terzopoulos, "Multilinear Subspace Analysis of Image Ensembles," in Proceedings of Computer Vision and Pattern Recognition, 2003.

Lei Zhang and Dimitris Samaras, "Face Recognition Under Variable Lighting using Harmonic Image Exemplars," in Proceedings of Computer Vision and Pattern Recognition, 2003, pp. I:19.25.

* cited by examiner

METHOD AND SYSTEM FOR GENERATING BI-LINEAR MODELS FOR FACES

FIELD OF THE INVENTION

This invention relates generally to computer vision, and more particularly to generating bi-linear models of faces, and using the bi-linear models to recognize faces in images.

BACKGROUND OF THE INVENTION

Face recognition is typically performed by comparing a 'probe' image of an unknown face with a 'gallery' of images of known faces. It is a problem to reliably recognize a face in a 2D image when there are variations in poses, camera viewpoints and illuminations in the probe and gallery images.

One prior art face recognition method uses multi-linear analysis for 2D facial images by applying a high order singular value decomposition (SVD) to 2D facial images under multiple factors, such as identity, expression, pose, and illumination, M. A. O. Vasilescu and D. Terzopoulos, "Multilinear Subspace Analysis of Image Ensembles," Proceedings of Computer Vision and Pattern Recognition, 2003. Because that method does not consider 3D shape information of faces, that has a reduced reliability when there are variations in pose and illumination directions that cast shadow due to the fact that the face not entirely spherical and convex, but also includes numerous concavities and protuberances.

Three-dimensional information about the shape of a face can be used to reduce this problem. The 3D shape information can be obtained directly from a range scanner or estimated from one or more images. Shape information can also be used to generate a synthetic image that is invariant of pose and illumination. Alternative, the 3D shape can be used to derive an analytic illumination subspace of a Lambertian object with spherical harmonics.

Various methods that use shape information are described by R. Basri and D. Jacobs, "Lambertian Reflectance and Linear Subspace," IEEE Transaction on Pattern Analysis and Machine Intelligence, vol. 25, no. 2, pp. 218-233, 2003; C. Beumier and M. Acheroy, "Automatic 3D Face Authentication," Image and Vision Computing, vol. 18, no. 4, pp. 315-321, 2000; V. Blanz and T. Vetter, "Face Recognition based on fitting a 3D morphable model," IEEE Transactions on Pattern Analysis and Machine Intelligence, vol. 25, no. 9, pp. 1063-1074, 2003; Alexander M. Bronstein, Michael M. Bronstein, and Ron Kimmel, "Expression-Invariant 3D Face Recognition," Proc. of the 4th Int. Conf. on Audio- and Video-Based Biometric Person Authentication, 2003, pp. 62.69; Kyong I. Chang, Kevin Bowyer, and Patrick Flynn, "Face Recognition Using 2D and 3D Facial Data," in Multimodal User Authentication Workshop, 2003; A. S. Georghiades, P. N. Belhumeur, and D. J. Kriegman, "From Few to Many: Illumination Cone Models for Face Recognition Under Variable Lighting and Pose," IEEE Transactions on Pattern Analysis and Machine Intelligence, vol. 23, no. 6, pp. 643-660, 2001; K. Lee, J. Ho, and D. Kriegman, "Nine Points of Light: Acquiring Subspaces for Face Recognition under Variable Lighting," Proceedings of Computer Vision and Pattern Recognition, 2001, vol. 1, pp.519-526; S. Romdhani, V. Blanz, and T. Vetter, "Face Identification by Fitting a 3D Morphable Model using Linear Shape and Texture Error Functions," European Conference on Computer Vision, 2002, pp.3-19, 2002; J. Huang, B. Heisele, and V. Blanz, "Component-based Face Recognition with 3D Morphable Models," Proc. of the 4th Int. Conf. on Audio- and Video-Based Biometric Person Authenticitation, 2003; and Lei Zhang and Dimitris Samaras, "Face Recognition Under Variable Lighting using Harmonic Image Exemplars," Proceedings of Computer Vision and Pattern Recognition, pp.19-25, 2003.

Three-dimensional shape information can be used directly as a pose and illumination independent model. The direct method uses a morphable model to obtain the 3D shape and 2D texture of a face from a single image. The model of the probe image is then compared with the models of the gallery images based on principal component analysis (PCA) coefficients. However, the direct method requires manual initialization of fiducial landmarks on the face and uses a non-linear, iterative fitting procedure, which can take minutes to converge, if at all, and then only to a local minimum. Thus, for several reasons, the direct method is not suited for real time applications.

Face recognition methods are related to the recognition paradigm of 'distance-from-a-subspace', which is derived from 2D appearance-based modeling. Although those methods can also use 3D morphable models, the 3D models are essentially a post-processing tool for subsequent invariant modeling and subspace generation, as opposed to a model that is used for face recognition, as in the direct method.

Several methods are known for generating a linear subspace that represents variations in illumination of a face. One method uses photometric stereo images to reconstruct the 3D face shape and 2D albedo from seven frontal images under different illuminations. The estimated 3D shape is then used to render synthetic images for various poses and illumination to train a person-specific illumination cone, A. S. Georghiades, P. N. Belhumeur, and D. J. Kriegman, "From Few to Many: Illumination Cone Models for Face Recognition Under Variable Lighting and Pose," IEEE Transactions on Pattern Analysis and Machine Intelligence, vol. 23, no. 6, pp. 643-660, 2001. It is desired to recognize a face from a single image, and to eliminate the rendering and training steps.

Basri et al. approximate the arbitrary illumination of a convex Lambertian 3D object by a low-dimensional linear subspace spanned by nine harmonic images. The nine harmonic images can be determined analytically given surface normals and the albedo. However, that method also assumes analytical Lambertian illumination with spherical harmonics, which are known to be incorrect for faces.

Another method finds nine directions of a point light source with which to approximate the span of the nine harmonic images. That method does not require the 3D shape, i.e., surface normals and albedo. However, it is not always practical to acquire nine images of every face to be recognized, K. Lee, J. Ho, and D. Kriegman, "Nine Points of Light: Acquiring Subspaces for Face Recognition under Variable Lighting," Proceedings of Computer Vision and Pattern Recognition, 2001, vol. 1, pp. 519-526, 2001.

It is desired to perform face recognition with a single probe image.

Another method estimates the nine harmonic images from a single image, Lei Zhang and Dimitris Samaras, "Face Recognition Under Variable Lighting using Harmonic Image Exemplars," Proceedings of Computer Vision and Pattern Recognition, pp. 19-25, 2003. That method uses a 3D bootstrap set obtained from a 3D face database, Sudeep Sarkar, "USF HumanID 3-D Database," University of South Florida, Tampa, Fla. Their method is also based on an analytic illumination subspace of a Lambertian objects with spherical harmonics.

However, any method based on a spherical harmonics has an inherent limitation, because faces are not entirely convex. Indeed, faces do not have exact Lambertian reflectance, which makes it difficult to deal with specularities, cast shadows, inter-reflections and subsurface scattering in the epidermal and dermal layers of the skin.

Therefore, it is desired to generate a bi-linear illumination model of a face directly from a single 2D image. Furthermore, it is desired to obtain a generic model for all types of faces, so faces can be recognized reliably. In addition, such a model would enable the rendering of synthetic facial images for arbitrary viewpoints and illumination, e.g., canonical basis images that are object-centered for greater flexibility. Furthermore, it is desired to have a model that is compact in storage and can be used in real time.

SUMMARY OF THE INVENTION

A method for generating a three-dimensional, bi-linear, illumination model for arbitrary faces is provided. A large number of images are acquired of many different faces. For each face, multiple images are acquired with varying poses and varying illumination.

A higher-order singular value decomposition is applied to the images to determine parameters of the model. The model can be fit to a probe image of an unknown face. Then, the model can be compared with models of a gallery of images of unknown faces to recognize the face in the probe image.

DETAILED DESCRIPTION OF THE PREFERRED EMBODIMENT

Figure 1:
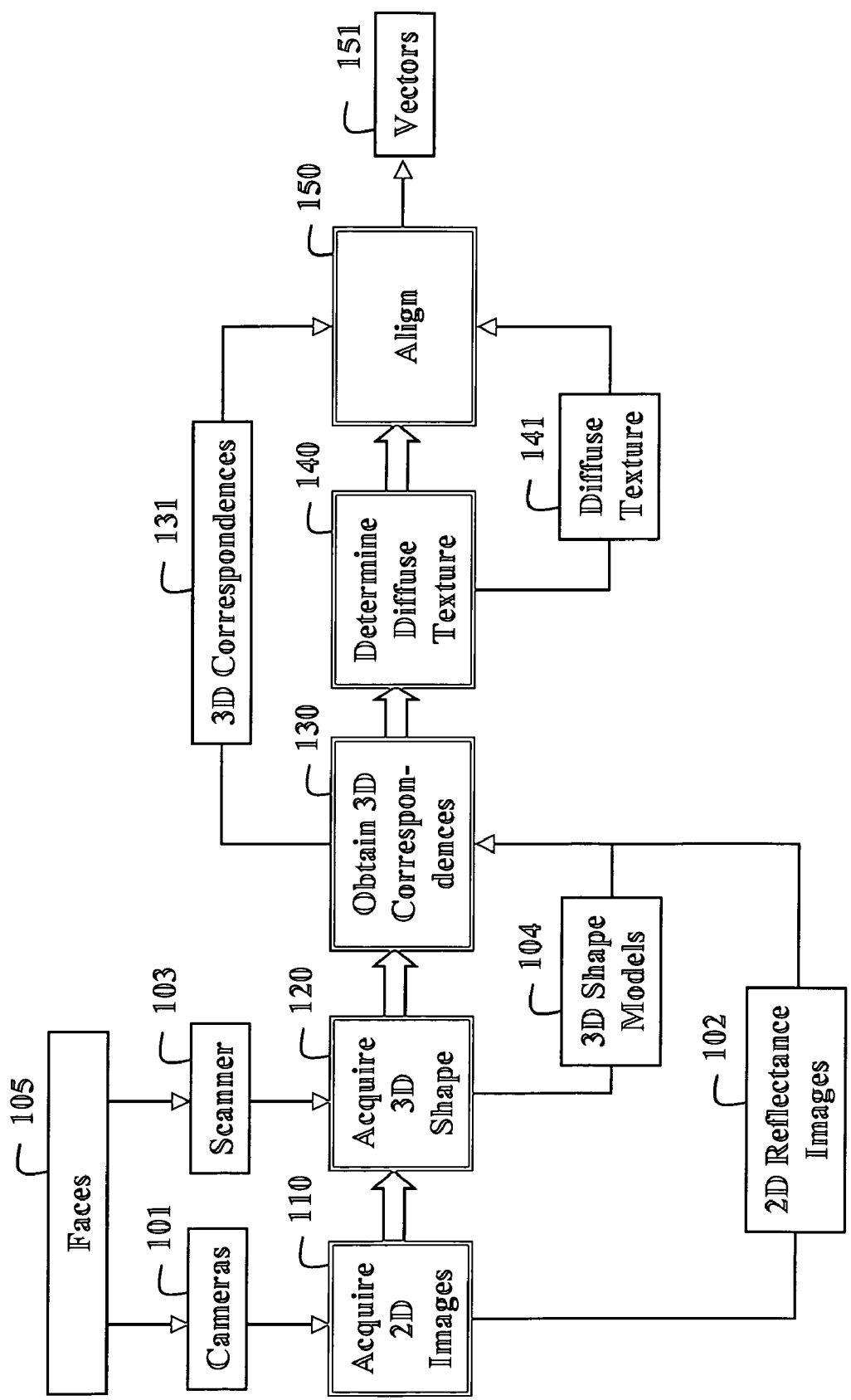
FIG. 1 is a flow diagram of a method for generating bi-linear models for faces.
Figure 2:
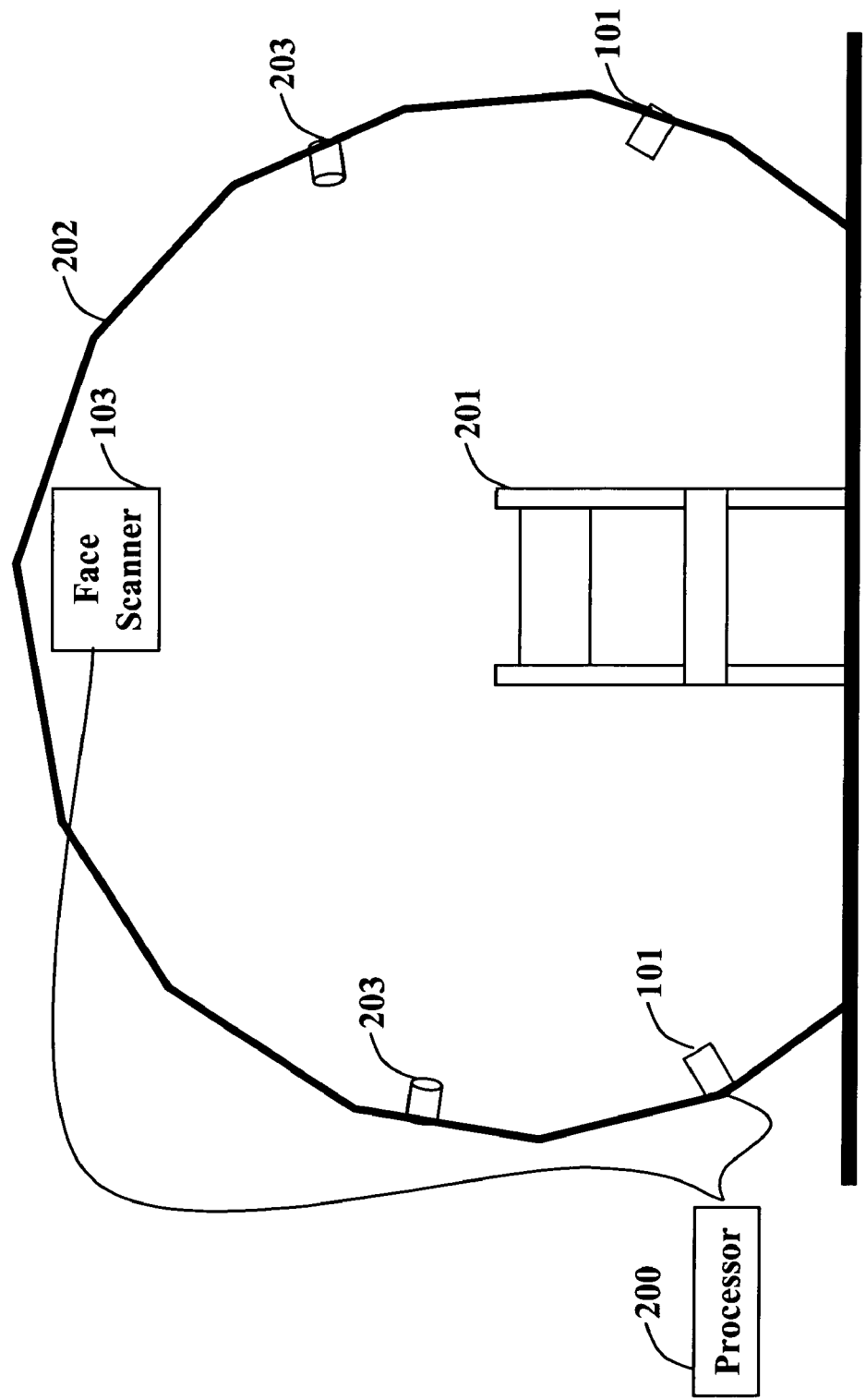
FIG. 2 is a block diagram of a system for acquiring shape and image data of faces.

FIGS. 1 and 2 show a method and system for generating a bi-linear illumination model for faces according to one embodiment of our invention. Multiple cameras 101 acquire 110 a large number of 2D reflectance images 102 of faces 105. For each face, multiple images are acquired of the face with varying poses or viewpoints, and varying directional illumination. For each face, a scanner 103 acquires 120 a 3D shape 104 of the face.

As shown in FIG. 2, persons sit on a chair 201 inside a tubular frame in the form of a geodesic dome 202. Digital cameras 101 are mounted on the frame and are aimed at the face from various viewpoints. The dome also includes directional light sources 203. We use 16 cameras and 150 light LEDs mounted semi-spherically on the dome 202 facing the chair 201. The output of the cameras and scanner are connected to a processor 200, which processes the images and 3D shape data.

During operation, the system sequentially turns each light on while simultaneously acquiring 110 the 2D images 102 with the cameras 101. We can also acquire high-dynamic range (HDR) images by repeating the acquisition sequence with different exposure settings.

The face-scanner 103 mounted in the dome includes two structured light projectors and four cameras. The output of the scanner is a polygon mesh containing about 40,000 triangles. The mesh resolves features as small as 1 mm. The mesh is cropping to remove non-facial areas and degenerate triangles.

Then, the mesh is refined using loop-subdivision, Loop, "Smooth Subdivision Surfaces based on Triangles," Master's thesis, Department of Mathematics, University of Utah, 1987. This results in a high-resolution mesh with 500,000 to 1 million vertices. The subdivision implicitly removes noise.

We convert the high-resolution mesh to an unstructured list of point samples, i.e., surfels without connectivity, U.S. Pat. No. 6,342,886 issued to Pfister, et al. on Jan. 29, 2002, "Method for interactively modeling graphical objects with linked and unlinked surface elements," incorporated herein by reference. Each surfel stores the necessary information for image reconstruction using EWA splatting, Zwicker et al. 2002.

Intrinsic and extrinsic parameters of all cameras are calibrated and the 3D points of a face are projected to corresponding 2D points in each image 102 through a 3D-2D registration process.

Bi-linear Illumination Model

We first obtain 130 3D point-to-point correspondences 131 for all faces 105 using the images and 3D shape. Illumination samples, i.e., pixel intensities, from each reflectance image 102 are projected from the 3D sample points on the face, yielding registered 2D samples which are thereby aligned with the 3D shape 104.

We also determine 140 a diffuse texture 141 for each face from all images for the face. Assuming that facial texture is not coupled with the shape and reflectance, we factor out diffuse texture from the illumination samples according to:

$$w_k = \hat{t}_k / t_k, \text{ for } k=1, \ldots, N$$

where the vector $\hat{t}_k$ is an illumination sample, $t_k$ is the diffuse texture at a 3D point $p_k$ in the mesh with N points. A texture-free illumination component is w, which is different from just reflectance because the component also includes cast shadows. In our notation, the vector symbol '^' and the estimation symbol '~' above the variables are sometimes omitted. Variables in bold are generally vectors and matrices.

As the result for each face, we have the 3D shape points (x, y, z) of the face 105, and texture-free illumination components (w) for each lighting condition (j) from a specific viewpoint or pose.

Figure 3:
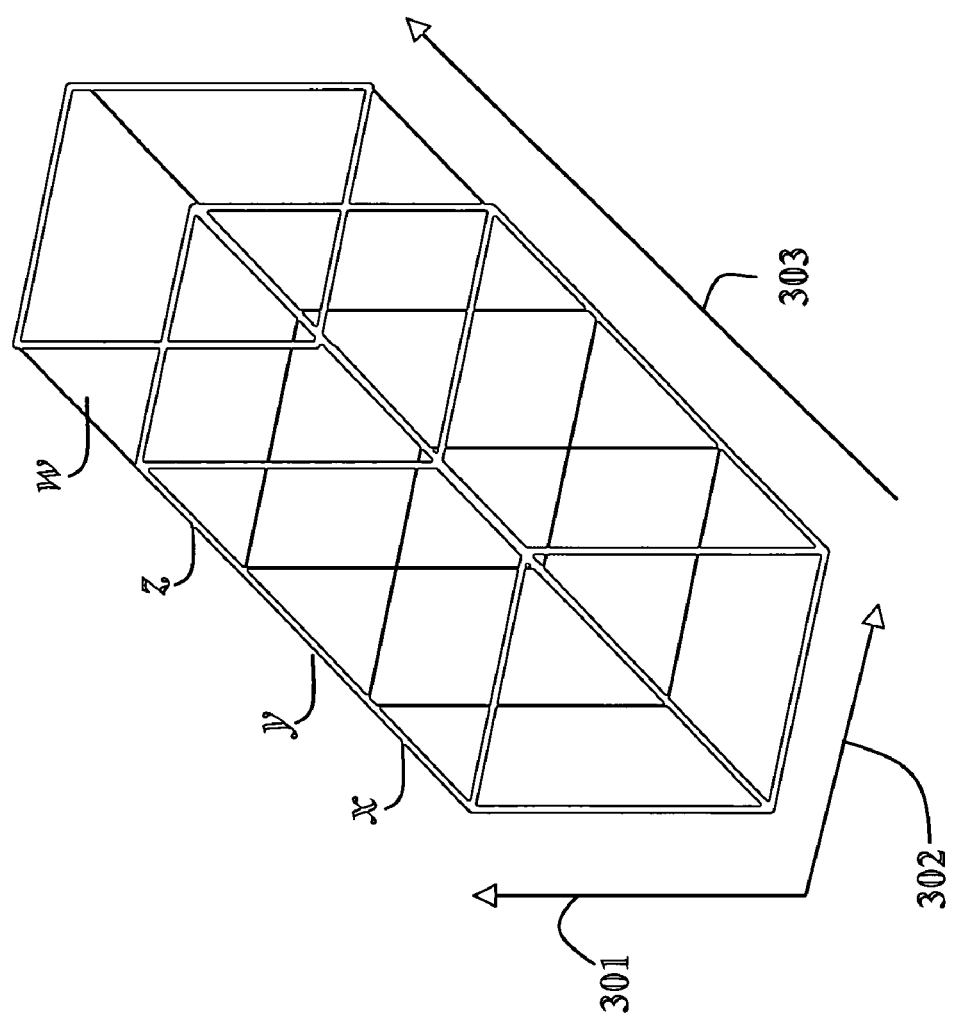
FIG. 3 is a block diagram of aligned shape points and texture components as vectors.

As shown in FIG. 3, we align 150 the 3D point-to-point correspondences (x, y, z) and texture components w for all faces into vectors 151:

$$a_{ij} = (x_1, \ldots, x_N, y_1, \ldots, y_N, z_1, \ldots, z_N, w_1, \ldots, w_N).$$

along intensity 301, illumination 302, and shape 303 axes.

Figure 4:
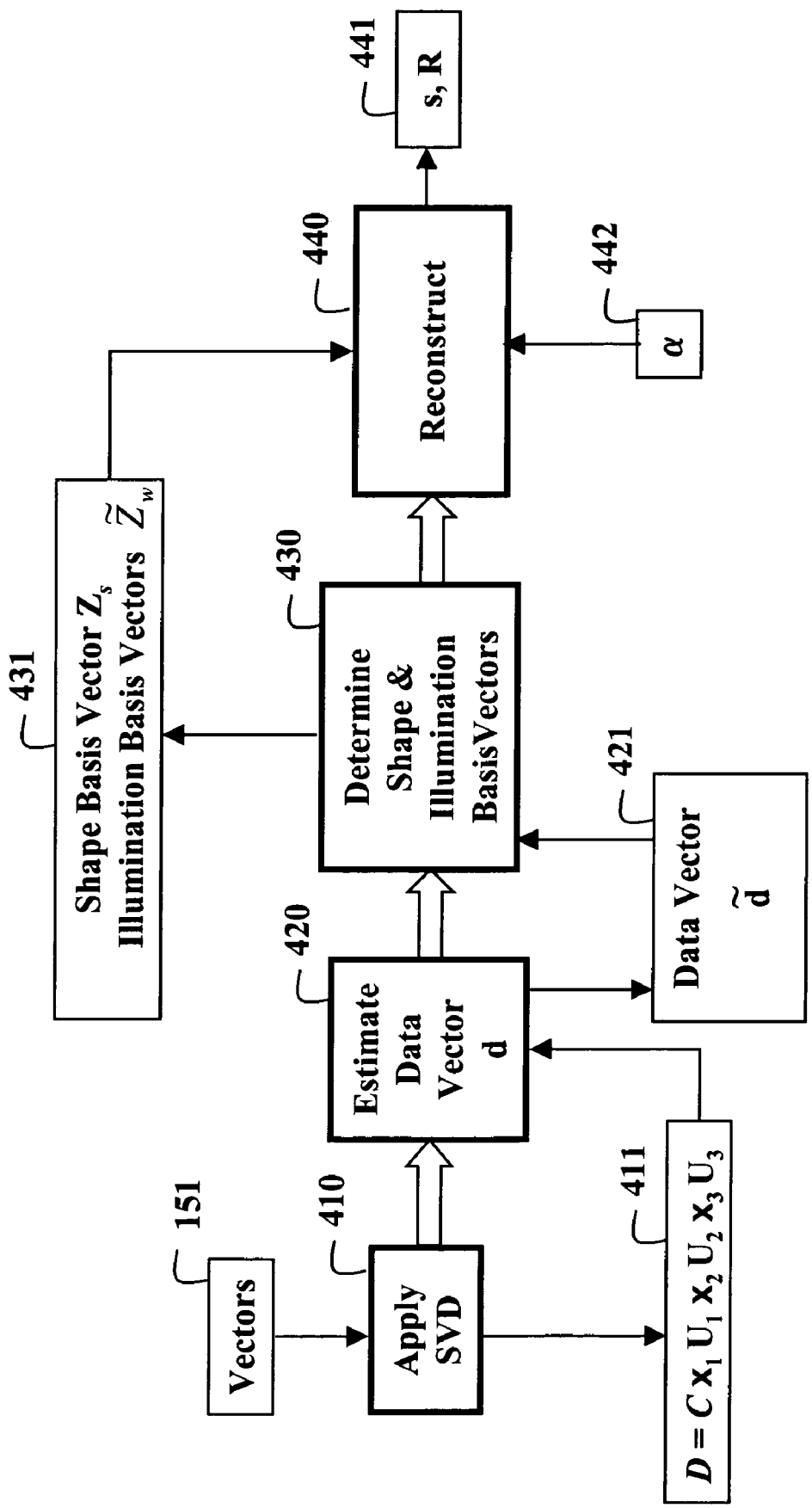
FIG. 4 is flow diagram of generating a bi-linear model from the vectors of FIG. 3.

As shown in FIG. 4, we then apply 410 a three-mode, higher order singular value decomposition (SVD) to the vectors 151 to determine a joint variation of both shape and illumination. The resulting data array is a tensor D 411 expressed as a product:

$$D = C x_1 U_1 x_2 U_2 x_3 U_3,$$

where mode matrices $U_1$, $U_2$, and $U_3$ represent the variation along the shape, illumination, and data axes, respectively. The core tensor C governs the interaction between the mode matrices. For details on the mode k product operator $x_k$, see L. D. Lathauwer, B. D. Moor, and J. Vandewalle, "A Multilinear Singular Value Decomposition," SIAM Journal of Matrix Analysis and Applications, vol. 21, no. 4, 2000.

Using the associative property of the mode-k product, the mode matrix $U_3$ can be incorporated into $Z=C \times_3 U_3$, resulting in a simplified equation:

$$D = Z \times_1 U_1 \times_2 U_2.$$

Next, we determine 430 shape and illumination basis vectors 431 as follows. To obtain a more compact representation, we delete or truncate the highest-order singular vectors and retain a reduced lower-dimensional subspace.

To exploit the redundancy of shape data, i.e., the (x, y, z) tuples along the illumination axis 302, we partition the estimate core tensor $\tilde{Z}$ into two parts. Thus, a data vector $\tilde{d}$ 421, with $i^{th}$ shape and $j^{th}$ lighting condition, is estimated 420 by:

$$\tilde{d}_{i,j} = (\tilde{Z}_{xyz} \times_1 \tilde{u}_1^i \times_2 \tilde{u}_2^j, \tilde{Z}_w \times_1 \tilde{u}_1^i \times_2 \tilde{u}_2^j) \quad (1)$$

Because the underlying shape 104 is independent of lighting condition (j), we predetermine the estimate $\tilde{Z}_{xyz} \times_2 u_2^j$ for any $j$, remove a singleton dimension, and obtain the shape basis row vectors $Z_S$. Also, shape-specific illumination bases $R_i$ are obtained by estimating $\tilde{Z}_w \times_1 u_1^i$ and removing a singleton dimension. Thus, Equation 1 becomes:

$$\tilde{d}_{i,j} = (\tilde{u}_1^i Z_S, \tilde{u}_2^j R_i), \quad (2)$$

where the estimates of $\hat{u}_1^i$ and $\hat{u}_2^i$ are shape and illumination coefficients of $\tilde{d}_{i,j}$, respectively.

Using the shape and illumination basis vectors $Z_S$ and $\tilde{Z}_w$ 431, and a linear combination of shape parameter $\alpha$ 442, we can reconstruct 440 corresponding shape and illumination bases 441 as following:

$$s = \alpha Z_S; \quad (3)$$

$$R = \tilde{Z}_w \times_1 \alpha; \quad (4)$$

$$\alpha = \sum_i \alpha_i \hat{u}_1^i, \quad (5)$$

where s is a shape vector (x, y, z) and the rows of R are the illumination basis vectors for a specific shape parameter $\alpha$ 442.

Although the shape parameter $\alpha$ can be described by Equation 5, there are cases when an arbitrary shape s can be supplied from an external source, other than the 3D shape 104. In such a case, we can fit the shape s to find a closest shape parameter a for our shape by solving the following linear system:

$$\hat{s} = \hat{\alpha} Z_S. \quad (6)$$

We use this technique to estimate an illumination subspace from a generic external shape, such as a morphable model, as described below.

Comparison with Nine Spherical Harmonics

Generating our bi-linear illumination model 441 with data acquired from one near-frontal camera viewpoint, we determine how well the subspace for this bi-linear illumination model can reconstruct the original data. We also compare our accuracy to that obtained by using nine spherical harmonics as basis images, see Basri et al., above.

Because we have ground truth for the 3D shape and illumination samples from multiple lighting conditions and viewpoints for many faces, we measure a reconstruction error from different numbers of bases for each method.

For each face i, we have a 3D shape $s_i$, diffuse texture $t_i$, and illumination samples $\hat{t}_{i,j,k}$, for all lighting conditions j and camera viewpoints k. Some of the illumination samples are unavailable for each viewpoint due to occlusion. Therefore, we use the notation $\tilde{t}$ for any vector that includes only valid samples.

Given the vectors s and $\tilde{t}$ and omitting the indices, we first determine the illumination bases R using our method and then using the nine harmonic images. Then, the diffuse texture t is multiplied by each column of the matrix $R^T$ in an element wise manner. This constructs texture-weighted illumination bases B. and a reconstruction error for $\tilde{t}$ is:

$$\text{error} = \|\tilde{t} - \hat{B}\hat{B}^T \tilde{t}\|, \quad (7)$$

where $\hat{B}$ is a QR decomposition of $\tilde{B}$, which contains only the valid rows of B corresponding to $\tilde{t}$. We determine the reconstruction errors for all combinations of subjects, lighting conditions, camera viewpoints, and the number of bases used for reconstruction for each method to generate an illumination subspace.

Figure 5:
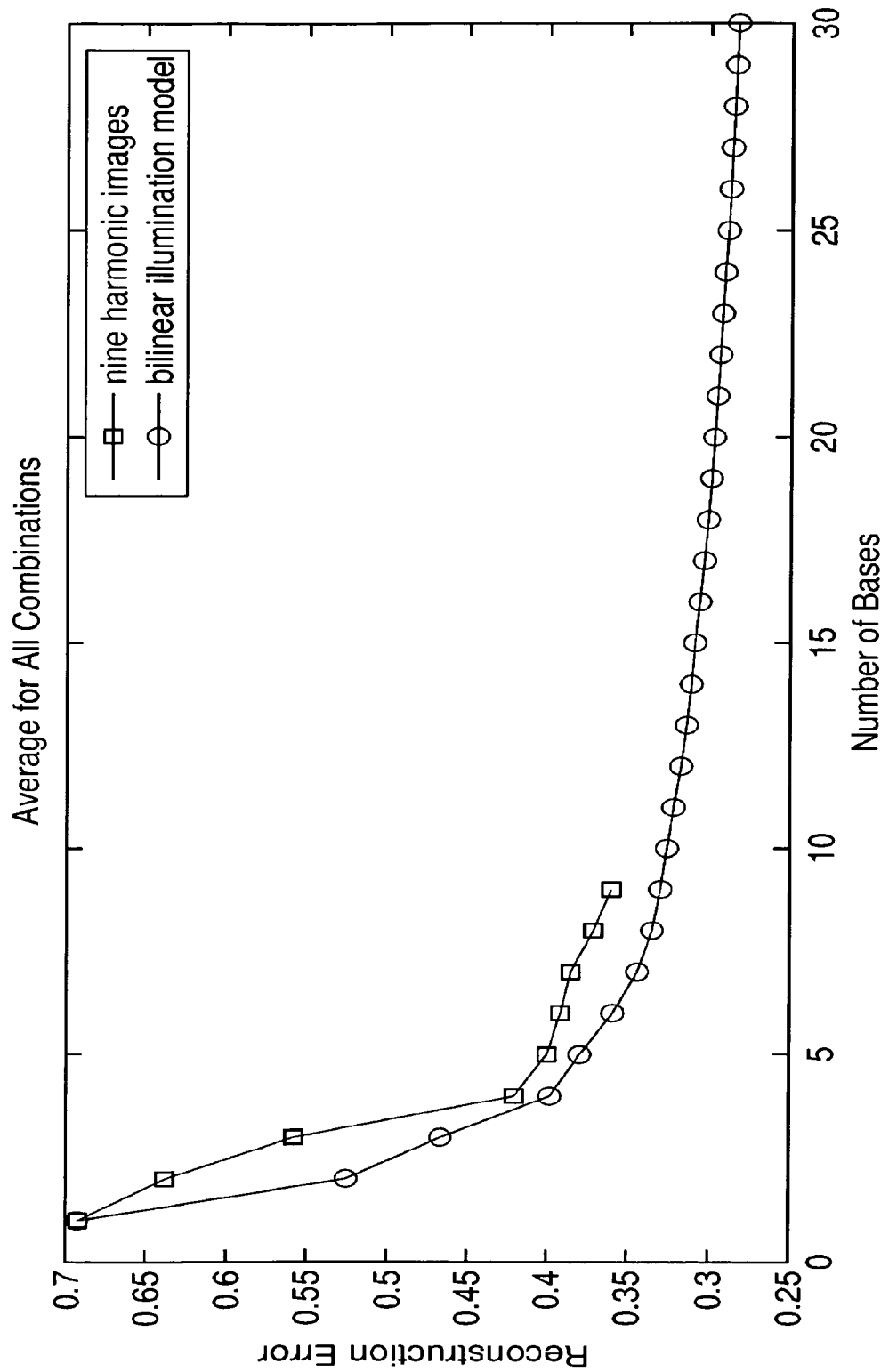
FIG. 5 is a graph comparing reconstruction errors for a different number of bases.
Figure 6:
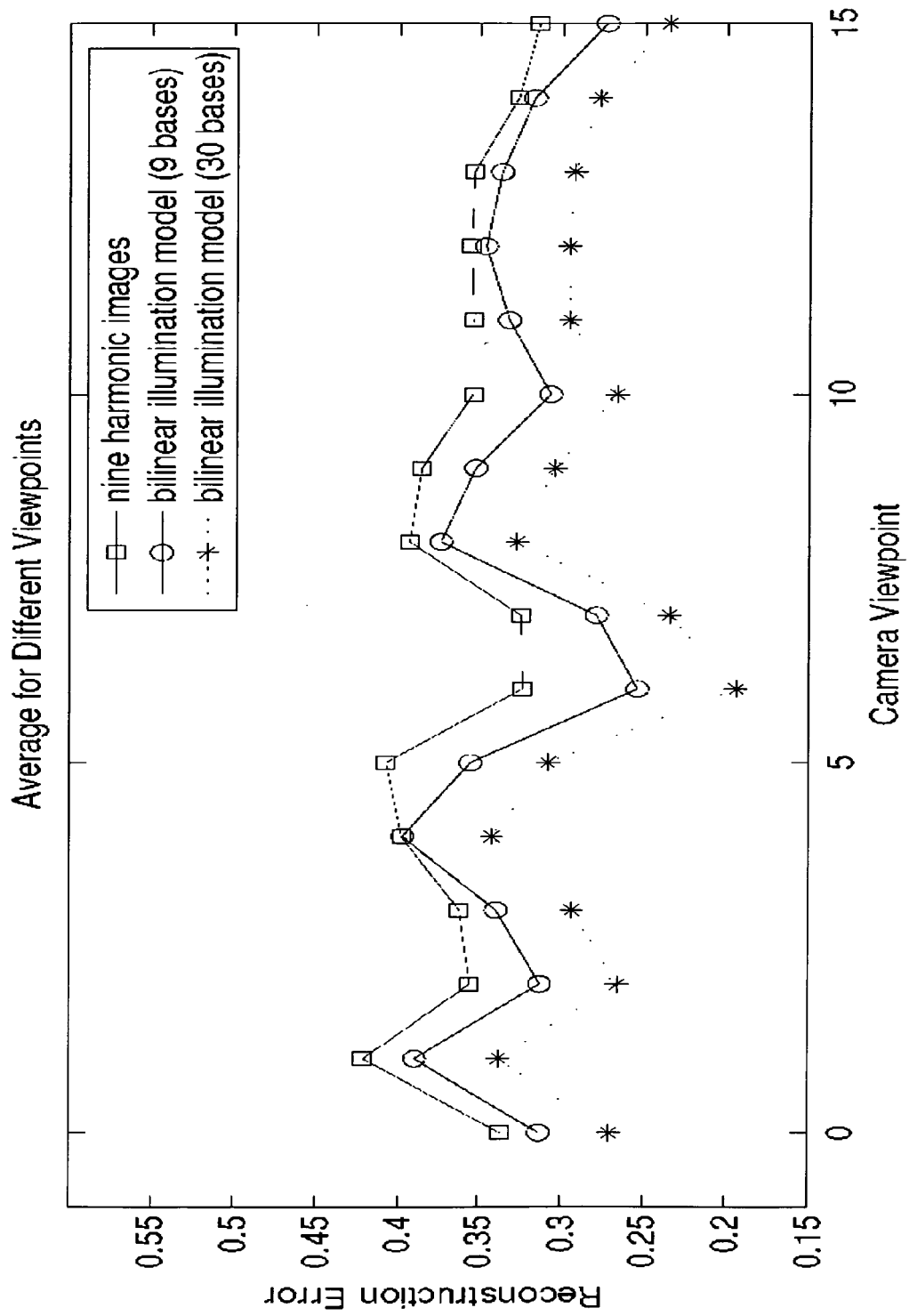
FIG. 6 is a graph comparing reconstruction errors for a different number of camera viewpoints.

FIG. 5 compares the reconstruction error for a different number of bases. and FIG. 6 compares the reconstruction error for a different number of camera viewpoints.

Estimation from a Single Image

We now describe how to obtain a face-specific illumination subspace given a single input image of a face. The illumination bases are derived from our bi-linear illumination model after fitting a morphable shape to the input image. This is achieved by minimizing a distance between the input image and the dynamically generated illumination subspace.

Shape-Specific Illumination Subspace

We construct a vector s for each facial shape, and a vector t for each corresponding texture. We perform principal component analysis (PCA) on the shape vectors S. and the texture vectors T, separately. Then, arbitrary shape and texture can be reconstructed using the first M eigenvectors and model parameters $\alpha$ and $\beta$ according to:

$$s = \bar{S} + \sum_{i=1}^{M} \alpha_i e_i^s, \quad (8)$$

$$t = \bar{T} + \sum_{i=1}^{M} \beta_i e_i^t,$$

where the average shape is $\bar{S}$, the average texture is $\bar{T}$, the $i^{th}$ eigenvector for the shape is $e_i^s$, and the eigenvector for texture is $e_i^t$.

The optimization parameters include $\alpha$, $\beta$, and $\gamma$. The parameter $\gamma$ is a 6-dimensional pose parameter, three for translation and three for rotation. During each iteration, we generate shape (s) and diffuse texture (t) from the parameters $\alpha$ and $\beta$, and $\gamma$. We also extract texture $\hat{t}$ by projecting s to the input image for a given pose $\gamma$. The optimal parameters are found by minimizing an error function similar to Equation 7.

Instead of the texture vector $\hat{t}$, we use the estimated texture $\tilde{t}$, which contains only the visible points in the extracted texture. We solve the following optimization using a downhill simplex method.

$$\arg\min_{\alpha,\beta,\gamma} \|\tilde{t} - \hat{B}\hat{B}^T \tilde{t}\|, \quad (9)$$

The simplex method is a non-linear optimization process that uses a cost function instead of gradients. The simplex method is especially suited for high dimensional parameter estimation.

Illumination Bases for Face Recognition

In conventional face recognition systems, the probe and gallery images are usually aligned with respect to the eyes, and other facial features are transformed accordingly. The variations in the shape are used by most systems, either implicitly or explicitly. Therefore it is important to derive the illumination bases in a typical 2D image space, and not in a shape-free 3D space.

We determine the 2D illumination basis images as follows. First, the basis images for the Phong illumination model registered with a 3D shape are divided by the corresponding reconstructed illumination samples, i.e., $B/\bar{t}_s$, and projected to an image plane in which the model fitting and refinement is performed. The projected pixel data are densely interpolated, using push-pull interpolation, into a cropped image plane and finally multiplied by the original cropped image. This procedure is performed for each reconstructed basis.

EFFECT OF THE INVENTION

A bi-linear illumination model and a 3D shape of a face are generated from a single image. To deal with the complex reflectance properties of human faces, a compact bi-linear illumination model is used. The model is generated from the statistics of 3D surface points and illumination samples acquired under many lighting conditions.

The model has better reconstruction and recognition performance than related conventional models. Moreover, the model can be extrapolated across different poses. The method can be used effectively by pose-invariant face recognition systems using the reconstructed illumination bases, which are registered with the recovered 3D shape.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for generating a bi-linear model of faces, comprising a processor for performing steps of the method, comprising the steps of:

acquiring, for each of a plurality of faces, a plurality of 2D images, the plurality of images acquired with a varying poses of the face and varying illuminations on the face;

acquiring, for each of the plurality of faces, a 3D shape model;

obtaining, for each of the plurality of faces, point-to-point correspondences using the 2D images and the 3D shape model;

determining, for each of the plurality of faces, a diffuse texture from the 2D images;

aligning the point-to-point correspondences and the diffuse textures into vectors;

applying a singular value decomposition to the vectors to determine a joint variation of both shape and illumination;

determining shape and illumination basis vectors from the shape and illumination; and reconstructing corresponding shape and illumination bases from a linear combination of the shape and illumination vectors, and a shape parameter to generate a bi-linear face model.

2. The method of claim 1, in which the 2D images are high-dynamic range images.

3. The method of claim 1, in which the 3D shape model is in a form of a polygon mesh.

4. The method of claim 3, further comprising:
   converting the polygon mesh to an unstructured list of point samples.

5. The method of claim 1, in which the singular value decomposition is a three-mode, higher order decomposition.

6. The method of claim 1 in which the shape and illumination vectors are three-mode tensors.

7. The method of claim 1, further comprising:
   fitting the 3D shape model to the 2D images using a linear subspace.

8. The method of claim 1, further comprising:
   performing face recognition with the bi-linear face model.

* * * * *